United States Patent
Shiotani

(10) Patent No.: US 9,326,022 B2
(45) Date of Patent: Apr. 26, 2016

(54) WIRELESS COMMUNICATION SYSTEM, WIRELESS COMMUNICATION DEVICE, AND WIRELESS COMMUNICATION METHOD

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 14/479,442

(22) Filed: Sep. 8, 2014

(65) Prior Publication Data

US 2015/0071281 A1    Mar. 12, 2015

(30) Foreign Application Priority Data

Sep. 11, 2013   (JP) ................................. 2013-188403

(51) Int. Cl.
| | |
|---|---|
| *H04N 21/43* | (2011.01) |
| *H04L 12/841* | (2013.01) |
| *H04L 7/00* | (2006.01) |
| *H04N 21/242* | (2011.01) |
| *H04W 72/00* | (2009.01) |
| *H04N 21/61* | (2011.01) |

(52) U.S. Cl.
CPC .......... *H04N 21/4305* (2013.01); *H04L 7/0041* (2013.01); *H04L 47/283* (2013.01); *H04N 21/242* (2013.01); *H04L 47/28* (2013.01); *H04N 21/6131* (2013.01); *H04W 72/00* (2013.01)

(58) Field of Classification Search
CPC ............................ H04L 7/0041; H04L 7/0033
See application file for complete search history.

(56) References Cited

U.S. PATENT DOCUMENTS

| | | | | |
|---|---|---|---|---|
| 7,657,645 B2 * | 2/2010 | Xu | ........................ | H04N 21/242 370/252 |
| 2007/0110027 A1 * | 5/2007 | Yeh | ..................... | H04L 12/6418 370/351 |
| 2007/0242678 A1 * | 10/2007 | Fu | .................. | H04N 21/234318 370/395.62 |
| 2008/0259962 A1 * | 10/2008 | Mori | ................... | H04N 21/4305 370/498 |
| 2008/0310460 A1 * | 12/2008 | Bargauan | ......... | H04N 21/23608 370/522 |
| 2009/0154347 A1 * | 6/2009 | Mamidwar | ............. | H04L 47/10 370/229 |
| 2010/0034136 A1 * | 2/2010 | Brener | ............... | H04B 7/18584 370/321 |
| 2011/0090999 A1 * | 4/2011 | Fuchikami | ....... | G11B 20/10009 375/371 |
| 2011/0312373 A1 | 12/2011 | Shiotani | | |
| 2012/0063394 A1 | 3/2012 | Shiotani | | |
| 2012/0082433 A1 * | 4/2012 | Kelly | ................... | G11B 27/005 386/241 |
| 2012/0314639 A1 | 12/2012 | Shiotani | | |

(Continued)

FOREIGN PATENT DOCUMENTS

| | | |
|---|---|---|
| JP | 2003-060652 | 2/2003 |
| JP | 4694969 | 3/2011 |
| JP | 2011-188324 | 9/2011 |
| WO | WO2005/067252 A1 | 7/2005 |

*Primary Examiner* — Redentor Pasia

(74) *Attorney, Agent, or Firm* — Cooper & Dunham LLP

(57) ABSTRACT

In a wireless communication system, a wireless transmitter generates a TS packet that includes a PCR value based on a timer value for a time preceding an offset time from start time of a PCR time slot and transfers a wireless frame that includes the TS packet with the PCR value at start time of the PCR time slot. The wireless receiver receives the wireless frame that includes the TS packet with the PCR value at the PCR time slot, measures propagation time of the wireless frame between the start time of the PCR time slot and time when the wireless frame that includes the TS packet with the PCR value is received, obtains sum of the offset time and the propagation time as delay time of the PCR value, and adjusts its timer value based on the PCR value acquired from the wireless frame and the obtained delay time.

8 Claims, 7 Drawing Sheets

(56) References Cited

U.S. PATENT DOCUMENTS

2013/0202027 A1* 8/2013 Marks .................. H04N 21/236 375/240.02

2013/0250836 A1 9/2013 Shiotani
2015/0288990 A1* 10/2015 Reimers ............. H04N 21/2385 725/109

* cited by examiner

WIRELESS COMMUNICATION SYSTEM, WIRELESS COMMUNICATION DEVICE, AND WIRELESS COMMUNICATION METHOD

CROSS-REFERENCE TO RELATED APPLICATION

This patent application is based on and claims priority pursuant to 35 U.S.C. §119(a) to Japanese Patent Application No. 2013-188403, filed on Sep. 11, 2013 in the Japan Patent Office, the entire disclosure of which is hereby incorporated by reference herein.

BACKGROUND

1. Technical Field

The present invention relates to a wireless communication system, wireless communication device, and a wireless communication method.

2. Background Art

Recently, many wired communication networks have been replaced by wireless communication networks. In particular, with the release of apparatuses that have only a wireless communications interface, such as tablet devices and smart-phones, it is projected that wireless communication networks will continue to be increasingly used. The transfer rate of wireless communication networks has been enhanced spectacularly in accordance with increasing demand. As a result, it has become possible to transfer large-sized data such as images and video and real-time data such as audio using wireless communication.

Wireless communication circuits in terminal devices included in wireless communication systems (wireless transmitters and wireless receivers) perform communication in synchronization with a predetermined series of time slots. Furthermore, in case of transferring data including both video and audio signals in synchronized time slots wirelessly, it is necessary to synchronize an encoder in the wireless transfer device with a decoder in the wireless receiver in order to synchronize the video signal with the audio signal. MPEG-2 Transport Stream (TS) technology is widely used as a technique that synchronizes the video signal with the audio signal and used in fields such as digital broadcasting. TS packets that include the video signal and the audio signal compressed using MPEG-2 and H.264 technology are transferred via a network.

In addition to the video signal and the audio signal, various other data is stored in the TS packets, including a Program Clock Reference (PCR) value. The PCR value indicates current time information of the encoder. The decoder controls output timing of the video signal and audio signal by adjusting an internal timer value using the PCR value and synchronizes the video signal with the audio signal.

By adopting MPEG-2-TS technology in the wireless communication system, it is possible to perform encoding and decoding of data in real time. However, in order to implement high-quality encoding and decoding in real time, it is necessary to minimize packet dropout on the wireless communication network and absorb fluctuation of propagation time in wireless transmission.

The video signal is compressed along the time axis to shrink the bandwidth necessary for wireless transmission. However, if TS packets are dropped due to frame dropout, an error occurs in decoding the video signal. In addition, if the reference image data is dropped, the follow-on video data cannot be decoded correctly.

In some cases, due to the fluctuation of the propagation time in wireless transmission, quality of the video signal and audio signal cannot be maintained. In MPEG-2-TS technology, as described above, the decoder absorbs skew in the clock signal to follow the time information of the encoder using the PCR value, and the decoder is synchronized with the encoder. However, if the propagation time of the TS packet that stores the PCR value varies, its arrival time also varies, and the time information of the encoder acquired from the PCR value varies as well. In this case, since the decoder follows the varied time, oscillating frequency of the clock signal goes up and down substantially, and that results in distorting the video signal and causing color shift. To cope with this issue, in the MPEG-2-TS specification, it is stipulated that PCR tolerance is to be kept to within several tens of μsec.

SUMMARY

An example embodiment of the present invention provides a novel wireless communication system that includes a wireless transmitter that transfers a TS packet of MPEG-2 wirelessly and a wireless receiver that receives the TS packet of MPEG-2 wirelessly. The wireless transmitter and the wireless receiver communicate with each other in synchronization with a predetermined series of time slots, and the series of time slots includes a PCR time slot allotted to a predetermined number of time slots for transferring a PCR value from the wireless transmitter to the wireless receiver. The wireless transmitter generates the TS packet that includes the PCR value based on a timer value of the wireless transmitter for a time preceding a predetermined offset time from start time of one PCR time slot and transfers a wireless frame that includes the TS packet with the PCR value at start time of the PCR time slot after generating the TS packet with the PCR value. The wireless receiver receives the wireless frame that includes the TS packet with the PCR value at the PCR time slot, measures propagation time of the wireless frame between the start time of the PCR time slot in which the wireless frame that includes the TS packet with the PCR value is received and time when the wireless frame that includes the TS packet with the PCR value is received, obtains sum of the offset time and the propagation time as delay time of the PCR value, and adjusts its timer value based on the PCR value acquired from the wireless frame and the obtained delay time.

Further example embodiments of the present invention provide a wireless communication method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
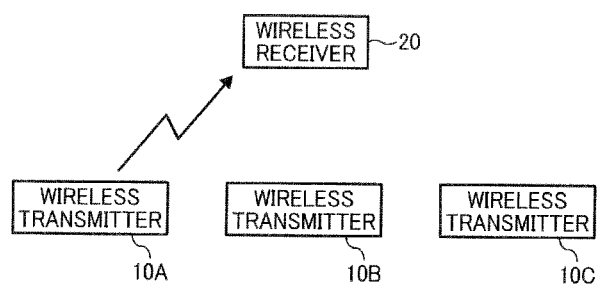
FIG. 1 is a schematic diagram illustrating a wireless communication system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional technologies described above, if there is a shift in the time information between the encoder and the decoder due to the fluctuation in the propagation time of the TS packet that includes the PCR value, a receive buffer in the decoder overflows, or data in the receive buffer runs out. As a result, distortion and color shift of the video is generated, and it is impossible to synchronize the video signal with the audio signal.

In the following embodiment, a wireless communication system that can synchronize the encoder in the wireless transmitter with the decoder in the wireless receiver is provided.

First Embodiment

FIG. 1 is a schematic diagram illustrating a wireless communication system in the first embodiment. The wireless communication system in FIG. 1 includes multiple wireless transmitters 10A, 10B, and 10C and a wireless receiver 20 and transfers the TS packets of MPEG-2 wirelessly. Examples of the wireless transmitters 10A, 10B, and 10C are a tuner and a DVD player etc. The wireless transmitters 10A, 10B, and 10C acquires input data that includes the video signal and audio signal (ES data), encodes it to the TS packet, and transfers a wireless frame that includes the TS packet to the wireless receiver 20 wirelessly. The wireless receiver 20 includes a display and a speaker for example. The wireless receiver 20 decodes the TS packet included in the wireless frame received from any one of the wireless transmitters 10A, 10B, and 10C wirelessly, acquires the original video signal and audio signal, synchronizes them, and outputs them from the display and the speaker.

Figure 2:
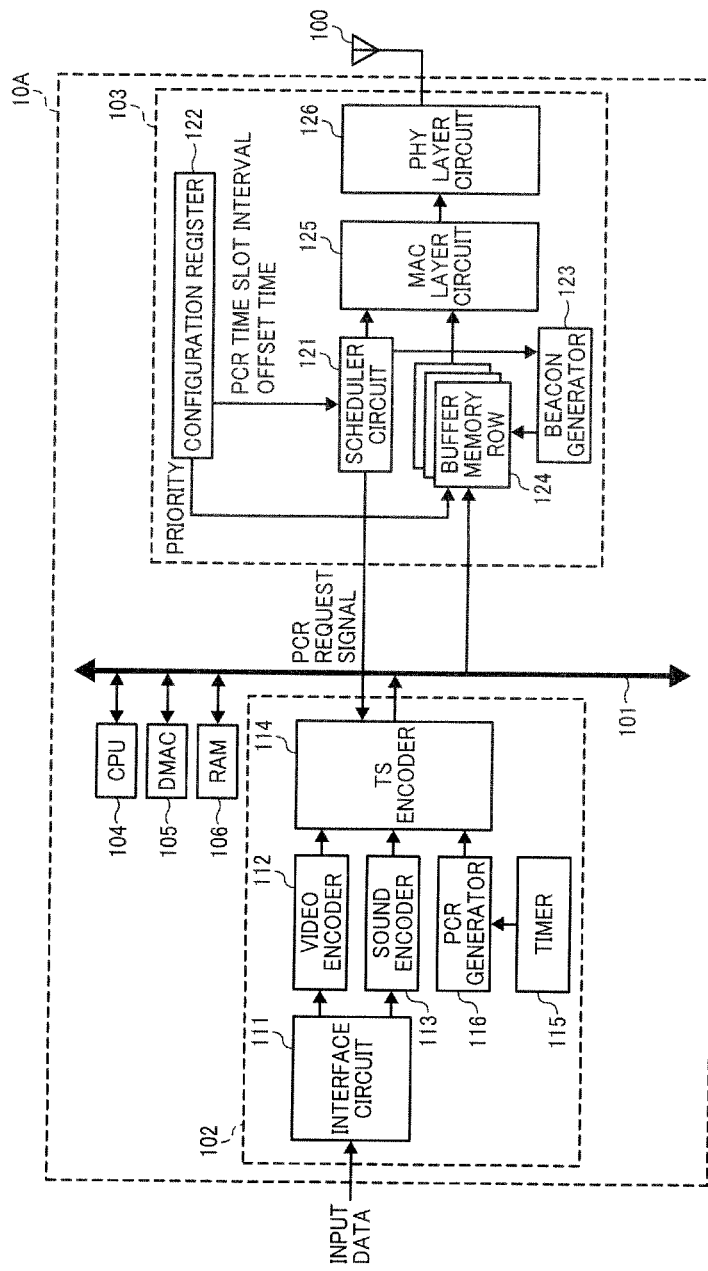
FIG. 2 is a block diagram illustrating a detailed configuration of a wireless transmitter 10A in FIG. 1.

FIG. 2 is a block diagram illustrating a detailed configuration of the wireless transmitter 10A shown in FIG. 1. The wireless transmitter 10A includes an antenna 100, bus 101, encoding circuit 102, wireless communication circuit 103, CPU 104, DMA controller (DMAC) 105, and RAM 106.

The encoding circuit 102 includes an interface circuit 111, video encoder 112, sound encoder 113, TS encoder 114, timer 115, and PCR generator 116. An example of the interface circuit 111 is HDMI interface etc. The interface circuit 111 separates the input data into the video signal and the audio signal and transfers the video signal to the video encoder 112 and the audio signal to the sound encoder 113. The video encoder 112 compresses the video signal and transfers it to the TS encoder 114. The sound encoder 113 compresses the audio signal and transfers it to the TS encoder 114. The TS encoder 114 generates a TS packet that includes the compressed video signal and audio signal, and the DMA controller 105 transfers the TS packet to the RAM 106 using DMA transfer. The PCR generator 116 generates the PCR value as current time information of the encoder circuit 102 based on a counter value (timer value) provided by the timer 115 and transfers it to the TS encoder 114. Under the control of a scheduler circuit 121 (described later) in the wireless communication circuit 103, the TS encoder 114 generates the TS packet including the PCR value at a constant frequency, and the DMA controller 105 transfers the TS packet including the PCR value to the wireless communication circuit 103 using DMA transfer.

The wireless communication circuit 103 includes the scheduler circuit 121, a configuration register 122, a beacon generator 123, a buffer memory row 124, a MAC layer circuit 125, and a PRY layer circuit 126. When a time slot that the wireless transmitter 10A reserves for transmission comes, the scheduler circuit 121 starts transferring the TS packet stored in the RAM 106 to the buffer memory row 124 using DMA transfer. The buffer memory row 124 includes multiple buffer memories as a queue for transferring data, and it is possible to configure priority of transfer for each buffer memory based on the priority stored in the configuration register 122. After performing MAC layer processes such as adding a header to the TS packet read from the buffer memory row 124, the MAC layer circuit 125 transfers the processed TS packet to the PHY layer circuit 126. The PHY layer circuit 126 generates a wireless frame by modulating the signal sent from the MAC layer circuit 125 and performing D/A conversion and transfers the wireless frame via the antenna 100 wirelessly. Based on a PCR time slot interval and offset time (described later) stored in the configuration register 122, the scheduler circuit 121 transfers a PCR request signal that requests to generate the TS packet including the PCR value to the TS encoder 114 at a constant frequency. The TS packet including the PCR value is transferred from the TS encoder 114 to the buffer memory row 124 using DMA transfer. The MAC layer circuit 125 and the PHY layer circuit 126 reads the TS packet including the PCR value from the buffer memory row 124, processes it, and generates the wireless frame that includes the TS packet including the PCR value. The wireless frame that includes the TS packet including the PCR value is transferred via the antenna 100. Under the control of the scheduler circuit 121, the beacon generator 123 generates a beacon frame at a constant frequency and stores it in the buffer memory row 124. The MAC layer circuit 125 and the PHY layer circuit 126 reads the beacon frame from the buffer memory row 124, processes it, and transfers it via the antenna 100 wirelessly. Based on user input entered from an external input device (not shown in figures), the CPU 104 can configure the priority, PCR time slot interval, and offset time in the configuration register 122 preliminarily.

Figure 3:
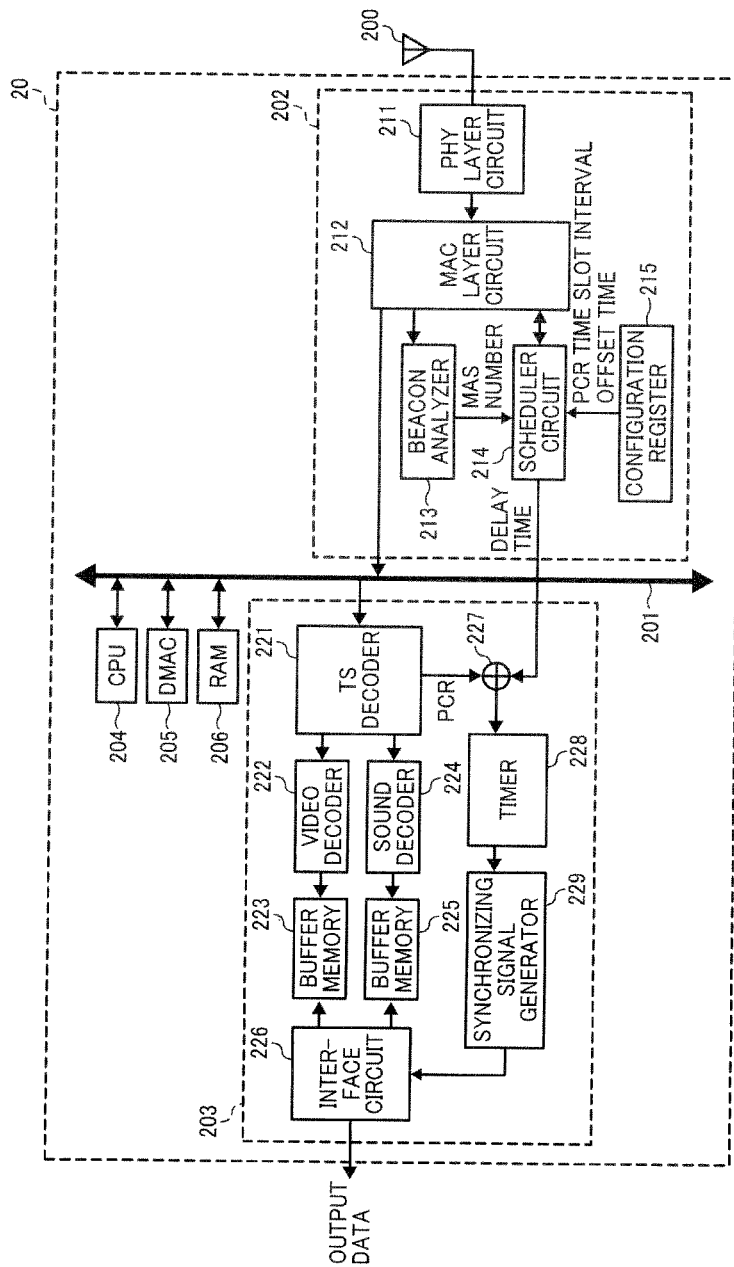
FIG. 3 is a block diagram illustrating a detailed configuration of a wireless receiver 20 in FIG. 1.

FIG. 3 is a block diagram illustrating a detailed configuration of the wireless receive 20 shown in FIG. 1. The wireless receiver 20 includes an antenna 200, bus 201, wireless communication circuit 202, decoding circuit 203, CPU 204, DMA controller 205, and RAM 206.

The wireless communication circuit 202 includes a PHY layer circuit 211, MAC layer circuit 212, beacon analyzer 213, scheduler circuit 214, and configuration register 215. The PHY layer circuit 211 receives the wireless frame and beacon frame transferred from the wireless transmitter 10A wirelessly via the antenna 200 under the control of the scheduler circuit 214. The PHY layer circuit 211 performs A/D conversion and decodes the received wireless frame and beacon frame and transfers the decoded signal to the MAC layer circuit 212. In case of receiving the wireless frame including the TS packet (data frame), the MAC layer circuit 212 transfers the TS packet to the RAM 206 using DMA transfer. In case of receiving the beacon frame, the MAC layer circuit 212 transfers the beacon frame to the beacon analyzer 213, and the beacon analyzer 213 decodes the beacon frame (described in detail later in the second embodiment). The configuration register 215 stores the same PCR time slot interval and offset time stored in the configuration register 122 in the wireless transmitter 10A. In case of receiving the wireless frame that includes the TS packet including the PCR value, the scheduler circuit 214 obtains delay time of the PCR value based on the PCR time slot interval and offset time and transfers it to the decoding circuit 203 (described later). Based on user input entered from an external input device (not shown in figures), the CPU 204 can configure the priority, PCR time slot interval, and offset time in the configuration register 215 preliminarily.

The decoding circuit 203 includes a TS decoder 221, video decoder 222, buffer memory 223, sound decoder 224, buffer memory 225, interface circuit 226, adder 227, timer 228, and synchronizing signal generator 229. The TS packet stored in the RAM 206 is transferred to the TS decoder 221 using DMA transfer. The TS decoder 221 separates the TS packet into the video signal and audio signal. The TS decoder 221 transfers the video signal to the video decoder 222 and the audio signal to the sound decoder 224. The video decoder 222 expands the video signal and stores it in the buffer memory 223 temporarily. The sound decoder 224 expands the audio signal and stores it in the buffer memory 225 temporarily. If the TS packet includes the PCR value, the TS decoder 221 extracts the PCR value. The extracted PCR value is corrected by adding the delay time by adder 227, and the corrected PCR value is transferred to the timer (System Time Clock) 228. The timer 228 adjusts its own count value (timer value) by comparing the input PCR value and transfers the adjusted count value to the synchronizing signal generator 229. Based on the input count value, the synchronizing signal generator 229 generates a synchronizing signal for synchronizing the video signal and audio signal and transfers it to the interface circuit 226. An example of the interface circuit 226 is HDMI interface etc. The interface circuit 226 reads the video signal and audio signal stored in the buffer memories 223 and 225 and generates output data synchronizing the video signal and audio signal based on the synchronizing signal.

Figure 4:
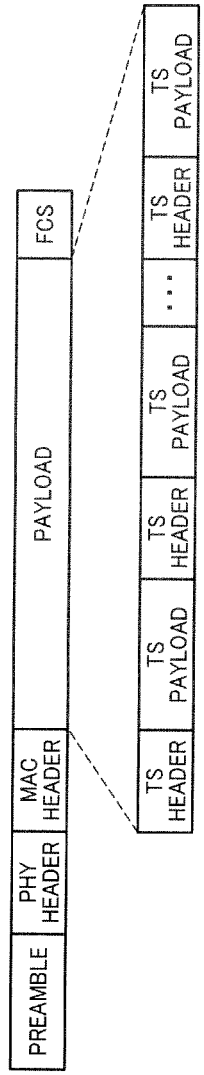
FIG. 4 is a diagram illustrating format of a wireless frame transferred in the wireless communication system in FIG. 1.

FIG. 4 is a diagram illustrating format of a wireless frame transferred in the wireless communication system shown in FIG. 1. The wireless frame includes a preamble, PHY header, MAC header, payload, and FCS field. The payload includes one or more TS packets. Each TS packet includes a TS header and TS payload, and compressed (or not compressed) video signal or audio signal is stored in the TS payload. If the TS packet includes the PCR value, the PCR value is stored in an adaptation field in the TS header.

Figure 5:
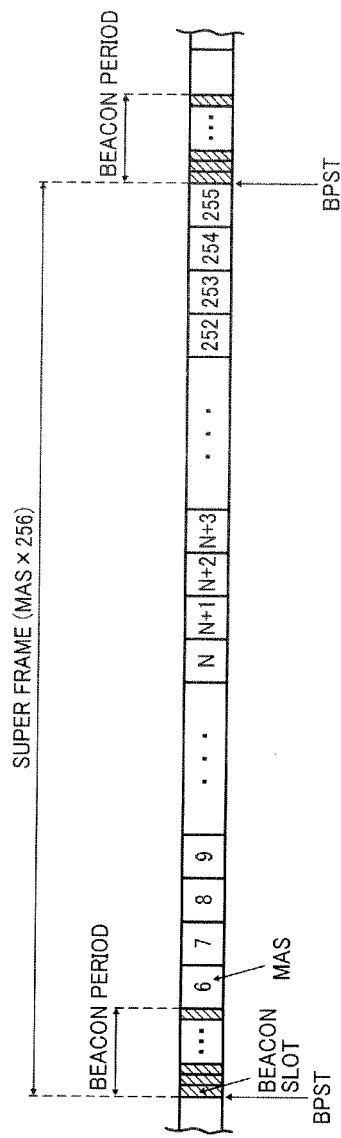
FIG. 5 is a diagram illustrating a super frame and Media Access Slot (MAS) used in the wireless communication system in FIG. 1.

FIG. 5 is a diagram illustrating a super frame and MAS used in the wireless communication system shown in FIG. 1. In the embodiments of the present invention, WiMedia-MAC specified by WiMedia Alliance is referred to as an example of wireless communication protocols. The terminal devices included in the wireless communication system communicate with each other using TDMA protocol. One super frame is divided into 256 time slots from MAS(0) to MAS(255).

One super frame is 65.536 msec long, and one time slot is 256 μsec long. Start time of each super frame is referred to as Beacon Period Start Time (BPST). A predetermined number of time slots from MAS(0) to MAS(5) starting from BPST are used as a beacon period that the terminal devices transfers and receives the beacon frame only. The beacon period is divided into multiple beacon slots. According to WiMedia-MAC, all terminal devices operate as self-beacon devices, and the terminal devices transfers the beacon frame at a predetermined beacon slot. Other than the beacon period, at time slots from MAS(6) to MAS(255), the terminal devices can transfer or receive the wireless frame (data frame). Before transferring or receiving the wireless frame, each terminal device decides a time slot number to be used with a counterpart terminal device and reserve it. Subsequently, the wireless frame is transferred or received using the reserved time slot. According to WiMedia-MAC, it is specified that all terminal devices adjust the BPST time for each super frame.

The wireless communication circuit 103 in the wireless transmitter 10A and the wireless communication circuit 202 in the wireless receiver 20 communicate in synchronization with a predetermined series of time slots. In case of transferring and receiving the wireless frame that includes the video signal and audio signal at the synchronized time slot, it is necessary to synchronize the encoder circuit 102 in the wireless transmitter 10A with the decoder circuit 203 in the wireless receiver 20 in order to synchronize the video signal with the audio signal. Therefore, the wireless communication system shown in FIG. 1 operates as described below.

Figure 6:
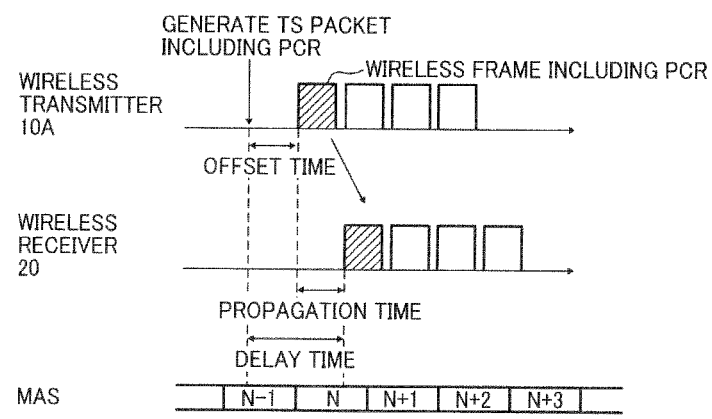
FIG. 6 is a timing chart illustrating transmission of a wireless frame that includes PCR in the wireless communication system in FIG. 1 in case the PCR time slot is MAS(N).

The series of time slots includes a PCR time slot allotted for the predetermined number of time slots to transfer the PCR value from the wireless transmitter 10A to the wireless receiver 20. For example, in the example of WiMedia-MAC described above, it is assumed that the PCR value is transferred at intervals of 100 msec. As described above, one super frame includes 256 time slots, and one time slot is 256 μsec long. Accordingly, the PCR time slots are allotted at 391 time slots corresponding to 100 msec. The wireless frame that includes the TS packet including the PCR value is transferred at the start time of the PCR time slot. In transferring the wireless frame that includes the TS packet including the PCR value for the first time, the wireless transmitter 10A determines the time slot number used for the transmission (e.g., "N") appropriately. If the wireless receiver 20 decodes the received wireless frame and finds out that the wireless frame includes the PCR value, the wireless receiver 20 stores the time slot number N that the wireless frame is received. Subsequently, the PCR time slot number is obtained by using "(N+391)% 256". For example, if the time slot that the wireless frame that includes the TS packet including the PCR value is transferred for the first time is MAS(130), the next PCR time slot will be MAS(9). Subsequently, the wireless transmitter 10A and the wireless receiver 20 recognize these time slots as the PCR time slots FIG. 6 is a timing chart illustrating transmission of a wireless frame that includes PCR in the wireless communication system shown in FIG. 1 in case the PCR time slot is MAS(N).

In the wireless transmitter 10A, the scheduler circuit 121 transfers a PCR request signal to the TS encoder 114 for a time preceding a predetermined offset time from start time of one PCR time slot MAS(N). The length of the offset time is determined considering propagation time of a signal inside the wireless transmitter 10A, e.g., based on a simulation. As long as there is no circuit change in the wireless transmitter 10A, the length of the offset time is constant. The TS encoder 114 generates the TS packet including the PCR value based on the count value of the timer 115 and transfers it to the buffer memory row 124. In the buffer memory row 124, the highest transmission priority is set to the buffer memory that stores the TS packet with the PCR value. The MAC layer circuit 125 and the PHY layer circuit 126 read the TS packet with the PCR value from the buffer memory row 124, process it, and generate the wireless frame that includes the TS packet with the PCR value. The MAC layer circuit 125 and the PHY layer circuit 126 transfer the wireless frame that includes the TS packet with the PCR value at the start time of the PCR time slot MAS(N) after generating the TS packet with the PCR value.

In the wireless receiver 20, the wireless communication circuit 202 receives the wireless frame that includes the TS packet with the PCR value at one PCR time slot MAS(N). The scheduler circuit 214 measures propagation time of the wireless frame between the start time of the PCR time slot MAS(N) in which the wireless frame that includes the TS packet with the PCR value is received and the time when the wireless frame that includes the TS packet with the PCR value is received. The scheduler circuit 214 obtains the sum of the offset time and the propagation time as the delay time of the PCR value. Based on the OCR value acquired from the wireless frame and the obtained delay time, the timer 228 adjusts its count value. Based on the adjusted count value, the synchronizing signal generator 229 generates the synchronizing signal to synchronize the video signal with the audio signal.

Each time the wireless receiver 20 receives the wireless frame that includes the TS packet with the PCR value, the wireless receiver 20 corrects the received PCR value. Consequently, it is possible to absorb the asynchronous wireless communication jitter.

In the conventional technologies, it is necessary that the transmitter embeds time information into a data packet and the receiver extracts the time information from the data packet. By contrast, in the wireless communication system shown in FIG. 1, the redundant processes described above is unnecessary, and it is possible to prevent data transfer efficiency from deteriorating because of embedding the time information.

In the wireless communication system shown in FIG. 1, it is possible to synchronize the encoder circuit 102 in the wireless transmitter 10A with the decoder circuit in the wireless receiver 20 without performing complicated processes and degrading the data transmission efficiency. Consequently, it is possible to synchronize the video signal with the audio signal in the output data of the decoder circuit 203.

Figure 7:
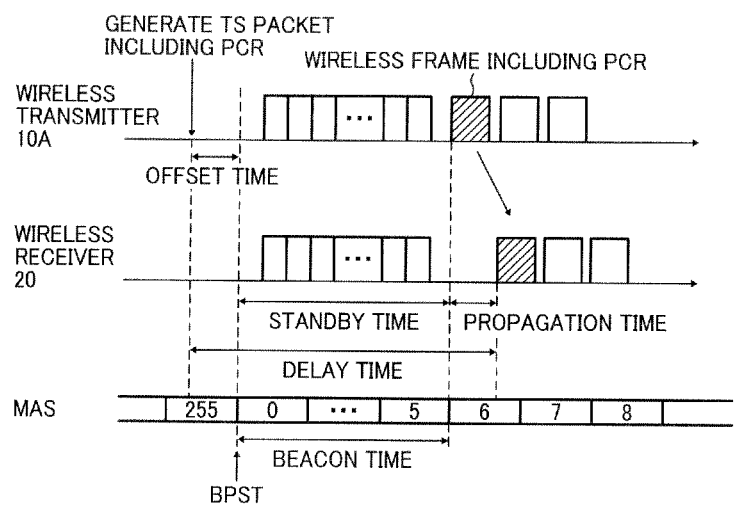
FIG. 7 is a timing chart illustrating transmission of a wireless frame that includes PCR in the wireless communication system in FIG. 1 in case the PCR time slot is MAS(0) within a beacon period.

FIG. 7 is a timing chart illustrating transmission of the wireless frame that includes PCR in the wireless communication system shown in FIG. 1 in case the PCR time slot is MAS(0) within a beacon period. After generating the TS packet with the PCR value, if the beacon period starts before transferring the wireless frame that includes the TS packet with the PCR value, it is not possible to transfer the wireless frame during the beacon period. In this case, the wireless frame that includes the TS packet with the PCR value is transferred after the beacon period ends as described below.

An operation in case the next PCR time slot MAS(0) after the PCR time slot that the wireless frame that includes the TS packet with the PCR value is transferred is included within the beacon period that the beacon frames are transferred is described below. In the wireless transmitter 10A, the TS encoder 114 generates the TS packet that includes the subsequent PCR value based on the count value of the timer 115 for a time preceding a predetermined offset time from start time of one PCR time slot MAS(0). At the start time of the time slot MAS(6) right after the beacon period, the MAC layer circuit 125 and the PHY layer circuit 126 transfers the wireless frame that includes the TS packet with the subsequent PCR value. In the wireless receiver 20, at the time slot MAS(6) right after the beacon period, the wireless communication circuit 202 receives the wireless frame that includes the TS packet with the subsequent PCR value. The scheduler circuit 214 measures propagation time of the wireless frame between the start time of the time slot MAS(6) right after the beacon period and the time when the wireless frame that includes the TS packet with the subsequent PCR value is received. The scheduler circuit 214 obtains standby time between the PCR time slot MAS(0) after generating the TS packet with the subsequent PCR value and the time slot right after the beacon period. Since both the wireless transmitter 10A and the wireless receiver 20 know position of the PCR time slot and the beacon period on the time axis preliminarily, the wireless receiver 20 can calculate the standby time based on the information described above. The scheduler circuit 214 obtains sum of the offset time, the standby time, and the propagation time as the delay time of the PCR value. The timer 228 adjusts the count value based on the subsequent PCR value acquired from the wireless frame and the obtained delay time.

In FIG. 7, it is assumed that the time slot MAS(0) is the PCR time slot. Similarly, if the time slots from MAS(1) to MAS(5) are the PCR time slots, the wireless frame that includes the TS packet with the PCR value is transferred at the start time of the time slot MAS(6) right after the beacon period. Therefore, time between the original PCR time slot and time when the wireless frame is transferred (time until the start time of the time slot MAS(6) right after the beacon period is obtained as the standby time Second Embodiment In the first embodiment described above, the wireless transmitter 10A and the wireless receiver 20 specify the OCR time slot in accordance with the predetermined rule. However, the wireless transmitter 10A and the wireless receiver 20 can share the information on specifying the PCR time slot in other ways. In this embodiment, the wireless transmitter 10A reports the information on specifying the PCR time slot to the wireless receiver 20 using the beacon frame.

Figure 8:
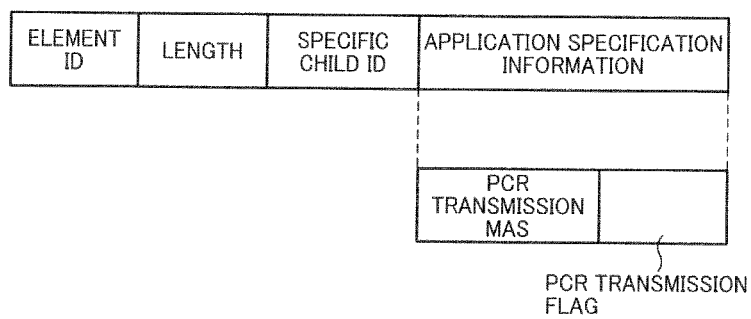
FIG. 8 is a diagram illustrating format of Application Specification Information Element (ASIE) field included in a beacon frame transferred in the wireless communication system as another embodiment of the present invention.

FIG. 8 is a diagram illustrating format of an ASIE field included in the beacon frame transferred in the wireless communication system in this embodiment. Vendor's original format can be configured to the ASIE field in the beacon frame. In FIG. 8, the ASIE field includes a PCR transmission MAS field and PCR transmission flag field as application specification information. The PCR transmission MAS field indicates the number of the PCR time slot in case of transferring the wireless frame that includes the TS packet with the PCR value in the current super frame. The PCR transmission flag field indicates whether or not the wireless frame that includes the TS packet with the PCR value is transferred in the current super frame.

Figure 9:
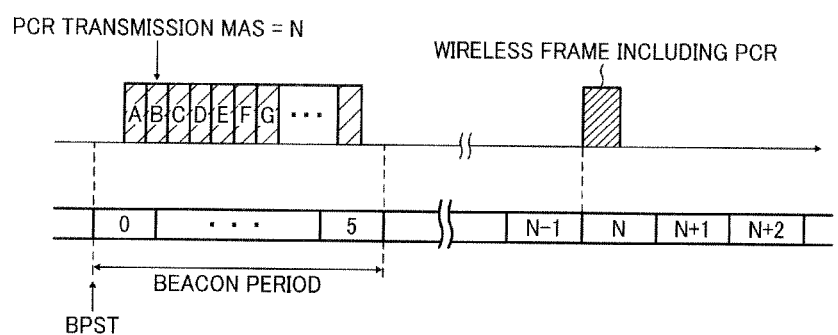
FIG. 9 is a timing diagram illustrating transmission of a wireless frame that includes PCR in the wireless communication system as the other embodiment of the present invention in case of reporting the PCR time slot using the ASIE field in FIG. 8.

FIG. 9 is a timing diagram illustrating transmission of a wireless frame that includes PCR in the wireless communication system in this embodiment in case of reporting the PCR time slot using the ASIE field shown in FIG. 8. In case of transferring the wireless frame that includes the TS packet with the PCR value using the current super frame, the scheduler circuit 121 in the wireless transmitter 10A generates the beacon frame that includes information for specifying the PCR time slot by using the beacon generator 123. In the ASIE field in the beacon frame, the PCR transmission MAS field includes the PCR time slot number, and the PCR transmission flag field includes bit "1". The MAC layer circuit 125 and the PHY layer circuit 126 transfers the beacon frame to the wireless receiver. In the wireless receiver 20, when the PHY layer circuit 211 receives the beacon frame, the MAC layer circuit 212 transfers the beacon frame to the beacon analyzer 213. After decoding the beacon frame, if the PCR transmission flag field includes bit "1", the beacon analyzer 213 extracts the PCR time slot number from the ASIE field in the beacon frame. If the extracted PCR time slot number corresponds to the time slot number that the wireless receiver 20 reserves for receiving, the wireless receiver 20 receives the wireless frame that includes the TS packet with the PCR value at the PCR time slot. The scheduler circuit 214 obtains the delay time of the PCR value from the PCR time slot number that the wireless frame that includes the TS packet with the PCR value is received and the PCR time slot number extracted from the beacon frame. By contrast, if the wireless frame that includes the TS packet with the PCR value is not transferred using the current super frame, in the ASIE field in the beacon frame, the PCR transmission flag field includes bit "0".

The format of the ASIE field described above is an example and not limited to that. Other formats can be used for that purpose as long as the similar function can be implemented.

At least a part of components that consist of the wireless transmitter 10A and the wireless receiver 20 can be implemented using software. In this case, a computer program that includes steps executed by the wireless transmitter 10A or the wireless receiver 20 can be provided. If the CPU 204 in the wireless receiver 20 executes the computer program, the CPU 204 functions as the wireless receiver 20. It is possible to provide a storage medium that stores the computer program described above.

In the conventional technologies, the transmitter reports the time information to the receiver. However, in this embodiment, it is necessary that the wireless transmitter 10A report the PCR time slot number only to the wireless receiver 20. Since data size of the PCR time slot number is smaller than the time information, it is not necessary to perform complicated processes, and it is possible to prevent the data transmission efficiency from deteriorating.

The offset time and interval of the PCR time slot stored in the configuration registers 122 and 215 are configurable by user operation. In addition, the priority of transmission stored in the configuration register 122 is configurable by user operation too.

The configuration of the wireless communication system described above is an example and not limited to that as long as the present invention can be implemented.

The wireless transmitter 10A shown in FIG. 2 includes HDMI interface as the interface circuit 111, and the wireless receiver 20 shown in FIG. 3 includes HDMI interface as the interface circuit 226. Other interfaces can be used as long as they can input/output the video signal and audio signal.

In the above description, WiMedia-MAC is taken as an example of the wireless communication protocols. However, the wireless communication system described above can use TDMA protocol or other wireless communication protocols with concept of a time slot.

The wireless communication system, wireless communication method, and the recording medium storing the wireless communication program in the present invention include a configuration described below.

The wireless communication system in the first embodiment includes the wireless transmitter and the wireless receiver that transfer the TS packet of MPEG-2 wirelessly. The wireless transmitter and the wireless receiver communicate with each other in synchronization with the predetermined series of time slots. The series of time slots includes the PCR time slot allotted to the predetermined number of time slots for transferring the PCR value from the wireless transmitter to the wireless receiver. The wireless transmitter generates the TS packet that includes the PCR value based on the timer value of the wireless transmitter for a time preceding a predetermined offset time from start time of one PCR time slot and transfers the wireless frame that includes the TS packet with the PCR value at the start time of the PCR time slot after generating the TS packet with the PCR value. The wireless receiver receives the wireless frame that includes the TS packet with the PCR value at one PCR time slot, measures propagation tune of the wireless frame between the start time of the PCR time slot in which the wireless frame that includes the TS packet with the PCR value is received and the time when the wireless frame that includes the TS packet with the PCR value is received, obtains the sum of the offset time and the propagation time as the delay time of the PCR value, and adjusts its tinier value based on the PCR value acquired from the wireless frame and the obtained delay time.

In the wireless communication system described in the second embodiment, if the PCR time slot subsequent to the PCR time slot that the wireless frame that includes the TS packet with the PCR value is included in the beacon period that transfers the beacon frame, the wireless transmitter generates the TS packet that includes the subsequent PCR value based on the timer value of the wireless transmitter for a time preceding a the offset time from start time of one PCR time slot and transfers the wireless frame that includes the TS packet with the subsequent PCR value at the start time of the time slot right after the beacon period. The wireless receiver receives the wireless frame that includes the TS packet with the subsequent PCR value at the time slot right after the beacon period, measures propagation time of the wireless frame between the start time of the time slot right after the beacon period and the time when the wireless frame that includes the TS packet with the subsequent PCR value is received, obtains standby time between the PCR time slot after generating the TS packet with the subsequent PCR value and the time slot right after the beacon period, obtains sum of the offset time, the standby time, and the propagation time as the delay time of the PCR value, and adjusts the timer value of the wireless receiver based on the subsequent PCR value acquired from the wireless frame and the obtained delay time.

In the wireless communication system in the third embodiment, the wireless transmitter generates the beacon frame that includes information for specifying the PCR time slot and transfers the beacon frame to the wireless receiver.

In the wireless communication system in the fourth embodiment, the offset time is preset to the wireless transmitter and the wireless receiver.

In the wireless communication system in the fifth embodiment, the PCR time slot interval is preset to the wireless transmitter and the wireless receiver.

In the wireless communication system in the sixth embodiment, the wireless transmitter transfers the wireless frame that includes the TS packet with the PCR value at the predetermined priority.

In the seventh embodiment, the wireless communication device functions as the wireless receiver in the wireless communication system that consists of the wireless transmitter and the wireless receiver that transfers the TS packet of MPEG-2 wirelessly. The wireless transmitter and the wireless receiver communicate with each other in synchronization with the predetermined series of time slots. The series of time slots includes the PCR time slot allotted to the predetermined number of time slots for transferring the PCR value from the wireless transmitter to the wireless receiver. The wireless transmitter generates the TS packet that includes the PCR value based on the timer value of the wireless transmitter for a time preceding a predetermined offset time from start time of one PCR time slot and transfers the wireless frame that includes the TS packet with the PCR value at the start time of the PCR time slot after generating the TS packet with the PCR value. The wireless communication device receives the wireless frame that includes the TS packet with the PCR value at one PCR time slot, measures propagation time of the wireless frame between the start time of the PCR time slot in which the wireless frame that includes the TS packet with the PCR value is received and the time when the wireless frame that includes the TS packet with the PCR value is received, obtains the sum of the offset time and the propagation time as the delay time of the PCR value, and adjusts its timer value based on the PCR value acquired from the wireless frame and the obtained delay time.

The present invention also encompasses a non-transitory recording medium storing a program that executes a method of communicating wirelessly between a wireless transmitter and a wireless receiver in synchronization with a predetermined series of time slots, the time slots including a PCR time slot allotted to a predetermined number of time slots for transferring a PCR value from the wireless transmitter to the wireless receiver. The method of communicating wirelessly, performed by the processor, includes the steps of generating a TS packet of MPEG-2 that includes a PCR value based on a timer value of the wireless transmitter for a time preceding a predetermined offset time from start time of one PCR time slot at the wireless transmitter, transferring a wireless frame that includes the TS packet with the PCR value from the wireless transmitter at start time of the PCR time slot, receiving the wireless frame that includes the TS packet with the PCR value at the wireless receiver at the PCR time slot, measuring propagation time of the wireless frame between the start time of the PCR time slot in which the wireless frame that includes the TS packet with the PCR value is received and time when the wireless frame that includes the TS packet with the PCR value is received at the wireless receiver, obtaining a delay time of the PCR value from the suns of the offset time and the propagation time at the wireless receiver, and adjusting a timer value of the wireless receiver based on the PCR value acquired from the wireless frame and the obtained delay time.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A wireless communication system, comprising:
   a wireless transmitter to transfer a TS packet of MPEG-2 wirelessly; and
   a wireless receiver to receive the TS packet of MPEG-2 wirelessly,
   wherein the wireless transmitter and the wireless receiver communicate with each other in synchronization with a predetermined series of time slots, the series of time slots including a PCR time slot allotted to a predetermined number of time slots for transferring a PCR value from the wireless transmitter to the wireless receiver,
   the wireless transmitter generates the TS packet that includes the PCR value based on a tinier value of the wireless transmitter for a time preceding a predetermined offset time from start time of one PCR time slot, and transfers a wireless frame that includes the TS packet with the PCR value at start time of the PCR time slot, and
   the wireless receiver receives the wireless frame that includes the TS packet with the PCR value at the PCR time slot, measures propagation tune of the wireless frame between the start time of the PCR time slot in which the wireless frame that includes the TS packet with the PCR value is received and time when the wireless frame that includes the TS packet with the PCR value is received, obtains a delay time of the PCR value from the sum of the offset time and the propagation time, and adjusts a timer value of the wireless receiver based on the PCR value acquired from the wireless frame and the obtained delay time.

2. The wireless communication system according to claim 1, wherein, when a beacon period that transfers a beacon frame includes a PCR time slot subsequent to the PCR time slot in which the wireless frame including the TS packet with the PCR value is transmitted, the wireless transmitter generates a TS packet that includes the subsequent PCR value based on the timer value of the wireless transmitter for a time preceding the offset time from start time of one PCR time slot, and transfers the wireless frame that includes the TS packet with the subsequent PCR value at the start time of the time slot right after the beacon period, and
   the wireless receiver receives the wireless frame that includes the TS packet with the subsequent PCR value at the time slot right after the beacon period, measures propagation time of the wireless frame between the start time of the time slot right after the beacon period and the time when the wireless frame that includes the TS packet with the subsequent PCR value is received, obtains a standby time between the PCR time slot after generating the TS packet with the subsequent PCR value and the time slot right after the beacon period, obtains the delay time of the PCR value from the sum of the offset time, the standby time, and the propagation time, and adjusts the tinier value of the wireless receiver based on the subsequent PCR value acquired from the wireless frame and the obtained delay time.

3. The wireless communication system according to claim 1, wherein the wireless transmitter generates the beacon frame that includes information for specifying the PCR time slot and transfers the beacon frame to the wireless receiver.

4. The wireless communication system according to claim 1, wherein the offset time is preset to the wireless transmitter and the wireless receiver, respectively.

5. The wireless communication system according to claim 1, wherein the PCR time slot interval is preset to the wireless transmitter and the wireless receiver, respectively.

6. The wireless communication system according to claim 1, wherein the wireless transmitter transfers the wireless frame that includes the TS packet with the PCR value in priority.

7. A wireless communication device that functions as a wireless receiver in a wireless communication system wherein the wireless communication system includes a wireless transmitter to transfer a TS packet of MPEG-2 wirelessly, the wireless communication device comprising:

the wireless receiver to receive the TS packet of MPEG-2 wirelessly, wherein the wireless transmitter and the wireless communication device communicate with each other in synchronization with a predetermined series of time slots, the series of time slots including a PCR time slot allotted to a predetermined number of time slots for transferring a PCR value from the wireless transmitter to the wireless communication device, the wireless transmitter generates the TS packet that includes the PCR value based on a timer value of the wireless transmitter for a time preceding a predetermined offset time from start time of one PCR time slot and transfers a wireless frame that includes the TS packet with the PCR value at start time of the PCR time slot after generating the TS packet with the PCR value, and the wireless communication device receives the wireless frame that includes the TS packet with the PCR value at the PCR time slot, measures propagation time of the wireless frame between the start time of the PCR time slot in which the wireless frame that includes the TS packet with the PCR value is received and time when the wireless frame that includes the TS packet with the PCR value is received, obtains a delay time of the PCR value from the sum of the offset time and the propagation time, and adjusts a timer value of the wireless communication device based on the PCR value acquired from the wireless frame and the obtained delay time.

8. A method of communicating wirelessly between a wireless transmitter and a wireless receiver in synchronization with a predetermined series of time slots, the time slots including a PCR time slot allotted to a predetermined number of time slots for transferring a PCR value from the wireless transmitter to the wireless receiver, the method comprising the steps of:

generating, at the wireless transmitter, a TS packet of MPEG-2 that includes a PCR value based on a timer value of the wireless transmitter for a time preceding a predetermined offset time from start time of one PCR time slot;

transferring, from the wireless transmitter, a wireless frame that includes the TS packet with the PCR value at start time of the PCR time slot;

receiving, at the wireless receiver, the wireless frame that includes the TS packet with the PCR value at the PCR time slot;

measuring, at the wireless receiver, propagation time of the wireless frame between the start time of the PCR time slot in which the wireless frame that includes the TS packet with the PCR value is received and time when the wireless frame that includes the TS packet with the PCR value is received;

obtaining, at the wireless receiver, a delay time of the PCR value from the suns of the offset time and the propagation time; and adjusting a timer value of the wireless receiver based on the PCR value acquired from the wireless frame and the obtained delay time.

\* \* \* \* \*